United States Patent Office 2,891,910
Patented June 23, 1959

2,891,910
TITANIUM COORDINATION COMPOUNDS AS CORROSION INHIBITORS

Michael J. Furey, Berkeley Heights, N.J., assignor to Esso Research and Engineering Company, a corporation of Delaware No Drawing. Application October 8, 1956
Serial No. 614,343

2 Claims. (Cl. 252—42.7)

This invention relates to new compositions of matter useful as rust preventives. Particularly, it relates to compounds formed by reacting an alkyl titanate with an alkyl primary amine, and to oil-type rust preventive compositions containing said compounds.

Oil-type rust preventive compositions comprising a rust inhibitor dissolved in an oil medium, are well known. This type of rust preventive is frequently used in equipment which requires lubrication in addition to protection from rust, such as internal combustion engines and in inaccessible systems, such as circulating oil and hydraulic systems. They are also used for preventing rusting of metal parts during processing and storage, and for similar other applications.

The oil-type rust inhibiting compositions included in this invention are prepared by incorporating into the oil base, compounds formed by reacting an alkyl titanate with a long chain alkyl primary amine. The base oil will generally be a mineral oil, such as a mineral lubricating oil, although synthetic oils may be used for special applications. Also the compounds of the invention may be used as rust preventives in heating oil, gasoline, etc.

The alkyl titanates used in forming the products of this invention are those having the general formula:

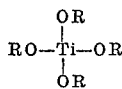

wherein each R is the same or a different alkyl group which may be a straight or branched-chain hydrocarbon radical containing between about 2 and 8 carbon atoms. Some examples of such titanates are butyl titanate $$Ti(OC_4H_9)_4$$

isopropyl titanate, $Ti(OC_3H_7)_4$; 2-ethyl hexyl titanate

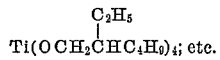

Titanates of the above general formula are known, and those wherein R is an alkyl group containing 4 to 8 carbon atoms, are useful per se in lubricating oil compositions as extreme pressure agents. However, it has now been found that by reacting the alkyl titanates with an alkyl primary amine, a new type of compound is formed which has excellent rust preventing properties.

The alkyl primary amines which may be reacted with the titanate are those having the general formula: $R'NH_2$ wherein R' is a straight or branched chain alkyl radical containing between about 16 and 24 carbon atoms.

Although not definitely known, it is believed that the titanate and the primary amine form a coordination compound in accordance with the following equation:

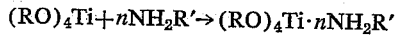

wherein $n = 1$ or 2.

The above reaction product is readily prepared by mixing one or two moles of the primary amine with about one mole of the titanate. The reaction is usually a rapid one, and will occur at room temperature, although the mixture may be slightly heated to temperatures of about 100 to 160° F. in order to speed up the reaction.

The rust preventive compositions of the invention will comprise a major amount of a petroleum mineral oil and a rust inhibiting amount, such as 0.1 to 10.0 wt. percent, e.g. 0.5 to 6 wt. percent, of the addition product of the titanate and long chain primary amines. Other additives may also be incorporated into the final composition such as dyes, metal deactivators, oxidation inhibitors and the like. Concentrates of the addition product in oil may also be prepared and will contain about 10 to 20 wt. percent of the addition product in the oil base. These concentrates may then be later diluted or blended to form the final product.

The invention will be further understood by the following examples which include preferred embodiments of the invention.

EXAMPLE I 1 mole of octadecylamine was added to 1 mole of butyl titanate and the mixture was heated to a temperature of 150° F. for 15 minutes. The resultant product, on cooling, was a light yellow solid and did not require any purification before use as a rust preventive.

EXAMPLE II

Example II was carried out in the same manner as Example I, except that 2 moles of octadecylamine were used.

EXAMPLE III

Oil blends of each of the reaction products of Examples I and II were prepared. Each blend consisted of 5 wt. percent of the reaction product, dissolved in an oil base which was a naphthenic type oil obtained by hydrofining a Coastal distillate and having a viscosity of 105.5 Saybolt Universal Seconds (S.U.S.) at 100° F. and 38.6 S.U.S. at 210° F. The above blends were clear and uniform at room temperature.

The above blends were evaluated for their rust preventive properties in a shed storage test according to the method described in Federal Specification MIL-C-16173A. This test is carried out by immersing sandblasted steel test panels in the test blend for 1 minute, then removing the panels and allowing them to drain for 24 hours at 77° F. The panels are then mounted vertically on wooden racks and placed in a louvred shed. For comparison purposes, the above shed storage test was also carried out at the same time on (1) the base oil of Example III, (2) various blends (using the base oil of Example III) of the reaction product of butyl titanate with shorter chain primary amines, and (3) a commercial oil type rust preventive. The composition of the various blends tested and the test results obtained are summarized in the following table.

Table I
EFFECT OF AMINE/BUTYL TITANATE REACTION PRODUCTS ON THE RUST-PREVENTIVE PROPERTIES OF MINERAL OIL

| Additive in Oil Base | Amine Type | Mole Ratio of Amine to Butyl Titanate | Appearance of Steel Panels After Shed Storage Test | |
|---|---|---|---|---|
| | | | 2 days | 15 days |
| None | | | No rust | Rust spots over 100% of surface. |
| 5 wt. percent | Amyl | 1/1 | ___do___ | Entire surface stained—80% surface rusted. |
| Do | ___do___ | 2/1 | ___do___ | Do. |
| Do | Propylene diamine | 2/1 | 10-30% surface solid rust. | 50-90% surface rusted. |
| Do | Mixture of tertiary alkyl primary amines [1] (t-$C_{12}H_{25}NH_2$ to t-$C_{15}H_{31}NH_2$). | 1/1 | Trace of rust | Entire surface had light stain. |
| Do | Octadecylamine | 1/1 | No rust | No rust and no stain. |
| Do | ___do___ | 2/1 | ___do___ | Do. |
| 5 wt. percent of a commercial rust inhibitor. | | | ___do___ | Entire surface stained, plus 40 to 200 rust spots. |

[1] Available under the trade name of "Primene 81R" from the Rohm and Haas Company.

As seen from the above table, the reaction product of butyl titanate with the short chain alkyl primary amines having less than 15 carbon atoms per molecule gave little rust protection. The compounds of the invention prepared from the titanate and the long chain primary amines gave excellent rust protection and were superior to a typical commercial type rust preventive.

EXAMPLE IV

A further test was carried out to determine the rust preventing ability of lower concentrations of the inhibitor in the oil base and under conditions of immersion in water. A 3-inch iron nail was cleaned and washed in methanol and in hexane, then completely immersed in the rust preventive composition for 10 seconds, and withdrawn. The nail was then placed upright in a test tube containing water. The nail was then examined for rusting at the end of 16 hours and 32 hours. The results of the above test and the compositions used are shown in the following table, where it is seen that the amine/titanate reaction products also inhibit corrosion at a concentration of 1% in the oil.

Table II
EFFECT OF AMINE/BUTYL TITANATE REACTION PRODUCTS IN PREVENTING RUSTING DURING WATER IMMERSION TESTS

| Additive in Oil Base [1] | Appearance of Iron Nail | |
|---|---|---|
| | 16 hours | 32 hours |
| None | Medium rust | Heavy rust. |
| 1.0 wt. percent product of 1 mole butyl titanate and 1 mole amyl amine. | None | Trace. |
| 1.0 wt. percent product of 1 mole butyl titanate and 2 moles amyl amine. | ___do___ | Do. |
| 1.0 wt. percent product of 1 mole butyl titanate and 1 mole octadecylamine. | ___do___ | None. |
| 1.0 wt. percent product of 1 mole butyl titanate and 2 moles octadecylamine. | ___do___ | Do. |

[1] Same oil base as in Table I.

What is claimed is:
1. An oil composition comprising a major proportion of a mineral oil and a minor rust inhibiting proportion of a compound formed by the reaction of an alkyl titanate having the general formula $(RO)_4Ti$ wherein each R represents an alkyl radical containing between 2 to 8 carbon atoms with an alkyl primary amine having between about 16 and 24 carbon atoms per molecule and wherein the mole ratio of said amine to said titanate is between 1 to 1 and 2 to 1.

2. A composition according to claim 1 wherein said rust inhibiting proportion is about 0.1 to 10.0 wt. percent of said reaction compound.

References Cited in the file of this patent
UNITED STATES PATENTS

| | | |
|---|---|---|
| 2,160,273 | Loane et al. | May 30, 1939 |
| 2,252,663 | Reiff | Aug. 12, 1941 |
| 2,566,363 | Pedlow et al. | Sept. 4, 1951 |
| 2,579,413 | Boyd | Dec. 18, 1951 |
| 2,649,696 | Neff | May 17, 1953 |
| 2,684,972 | Haslam | July 27, 1954 |
| 2,795,553 | Lowe | June 11, 1957 |

FOREIGN PATENTS

| | | |
|---|---|---|
| 1,108,075 | France | Aug. 17, 1955 |